US012327945B2

(12) United States Patent
Hirose

(10) Patent No.: US 12,327,945 B2
(45) Date of Patent: Jun. 10, 2025

(54) FEMALE TERMINAL AND FEMALE TERMINAL MANUFACTURING METHOD

(71) Applicant: SUMITOMO WIRING SYSTEMS, LTD., Mie (JP)

(72) Inventor: Yuki Hirose, Mie (JP)

(73) Assignee: SUMITOMO WIRING SYSTEMS, LTD., Mie (JP)

( * ) Notice: Subject to any disclaimer, the term of this patent is extended or adjusted under 35 U.S.C. 154(b) by 485 days.

(21) Appl. No.: 17/728,261

(22) Filed: Apr. 25, 2022

(65) Prior Publication Data

US 2022/0344849 A1 Oct. 27, 2022

(30) Foreign Application Priority Data

Apr. 26, 2021 (JP) ................................. 2021-073826

(51) Int. Cl.
*H01R 13/11* (2006.01)
*H01R 4/18* (2006.01)
*H01R 13/17* (2006.01)
*H01R 43/048* (2006.01)

(52) U.S. Cl.
CPC ............. *H01R 13/11* (2013.01); *H01R 4/185* (2013.01); *H01R 13/17* (2013.01); *H01R 43/048* (2013.01)

(58) Field of Classification Search
CPC ........................ H01R 13/11-17; H01R 4/4818
See application file for complete search history.

(56) References Cited

U.S. PATENT DOCUMENTS

| | | | | | |
|---|---|---|---|---|---|
| 5,702,272 | A * | 12/1997 | Machida | H01R 43/16 | |
| | | | | 439/852 | |
| 6,042,433 | A * | 3/2000 | Chen | H01R 13/114 | |
| | | | | 439/852 | |
| 9,236,675 | B2 * | 1/2016 | Tsuji | H01R 13/187 | |
| 2007/0111614 | A1 * | 5/2007 | Tanaka | H01R 13/113 | |
| | | | | 439/852 | |
| 2012/0142233 | A1 * | 6/2012 | Blasko | H01R 13/113 | |
| | | | | 439/852 | |
| 2017/0054237 | A1 * | 2/2017 | Uezono | H01R 13/115 | |
| 2018/0219315 | A1 * | 8/2018 | Kitamura | H01R 13/113 | |
| 2019/0393638 | A1 * | 12/2019 | Chiba | H01R 13/424 | |

FOREIGN PATENT DOCUMENTS

| | | | |
|---|---|---|---|
| JP | H07-045322 A | | 2/1995 |
| JP | 2015079599 A | * | 4/2015 |

* cited by examiner

*Primary Examiner* — Tulsidas C Patel
*Assistant Examiner* — Carlos E Lopez-Pagan
(74) *Attorney, Agent, or Firm* — Venjuris, P.C.

(57) ABSTRACT

A female terminal includes a terminal body having a bottom wall and a spring member mounted in the terminal body. The terminal body includes a connecting tube portion continuous with the bottom wall, a tab of a male terminal being inserted into the connecting tube portion, a resilient contact piece configured to resiliently contact the tab inserted into the connecting tube portion, and a through hole penetrating through the bottom wall. The spring member is made of metal having a higher elastic modulus than the resilient contact piece. One end part of the spring member biases the resilient contact piece in a direction toward the tab by coming into contact with the resilient contact piece. The other end part of the spring member is located in a region inside a hole edge part of the through hole with the spring member mounted in the terminal body.

6 Claims, 12 Drawing Sheets

FEMALE TERMINAL AND FEMALE TERMINAL MANUFACTURING METHOD

CROSS-REFERENCE TO RELATED APPLICATIONS

This application is based on and claims priority from Japanese Patent Application No. 2021-073826, filed on Apr. 26, 2021, with the Japan Patent Office, the disclosure of which is incorporated herein in its entirety by reference.

TECHNICAL FIELD

The present disclosure relates to a female terminal and a female terminal manufacturing method.

BACKGROUND

Conventionally, there is known a female terminal described in Japanese Patent Laid-open Publication No. H07-045322. This female terminal is such that a male contact receiving portion of a female contact is formed into a substantially box shape composed of an upper wall, a side wall and a bottom wall, and a spring piece is arranged in the male contact receiving portion. Further, a spring member made of stainless steel having a higher elastic modulus than the spring piece is arranged below the spring piece.

SUMMARY

According to the above configuration, since the spring member is disposed in the box-shaped male contact receiving portion, there is a problem that it is difficult to confirm whether or not the spring member has been disposed at a proper position in the male contact receiving portion.

The present disclosure was completed on the basis of the above situation and aims to provide a female terminal-related technique enabling easy confirmation of whether or not a spring member is disposed at a proper position.

The present disclosure is directed to a female terminal with a terminal body including a bottom wall, and a spring member mounted in the terminal body, wherein the terminal body includes a connecting tube portion continuous with the bottom wall, a tab of a male terminal being inserted into the connecting tube portion, a resilient contact piece configured to resiliently contact the tab inserted into the connecting tube portion, and a through hole penetrating through the bottom wall, and the spring member is made of metal having a higher elastic modulus than the resilient contact piece, one end part of the spring member biases the resilient contact piece in a direction toward the tab by coming into contact with the resilient contact piece, and the other end part of the spring member is located in a region inside a hole edge part of the through hole with the spring member mounted in the terminal body.

According to the present disclosure, whether or not a spring member is disposed at a proper position with respect to a terminal body can be easily confirmed.

The foregoing summary is illustrative only and is not intended to be in any way limiting. In addition to the illustrative aspects, embodiments, and features described above, further aspects, embodiments, and features will become apparent by reference to the drawings and the following detailed description.

DETAILED DESCRIPTION

Figure 1:
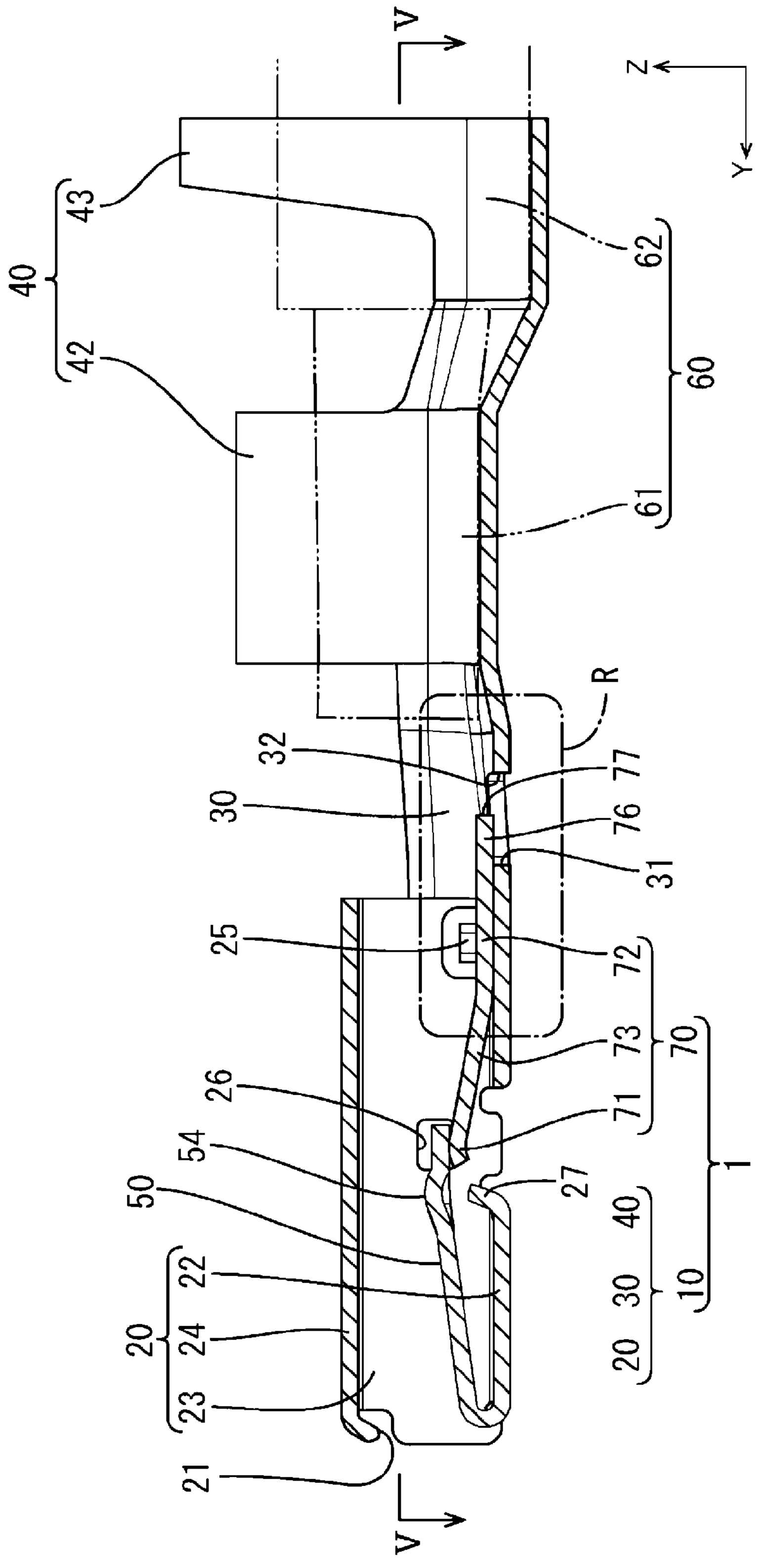
FIG. 1 is a longitudinal section along I-I of FIG. 3 showing a female terminal according to one embodiment.

In the following detailed description, reference is made to the accompanying drawings, which form a part hereof. The illustrative embodiments described in the detailed description, drawings, and claims are not meant to be limiting. Other embodiments may be utilized, and other changes may be made, without departing from the spirit or scope of the subject matter presented here.

Description of Embodiments of Present Disclosure

First, embodiments of the present disclosure are listed and described.

(1) The present disclosure is directed to a female terminal with a terminal body including a bottom wall, and a spring member mounted in the terminal body, wherein the terminal body includes a connecting tube portion continuous with the bottom wall, a tab of a male terminal being inserted into the connecting tube portion, a resilient contact piece configured to resiliently contact the tab inserted into the connecting tube portion, and a through hole penetrating through the bottom wall, and the spring member is made of metal having a higher elastic modulus than the resilient contact piece, one end part of the spring member biases the resilient contact piece in a direction toward the tab by coming into contact with the resilient contact piece, and the other end part of the spring member is located in a region inside a hole edge part of the through hole with the spring member mounted in the terminal body.

Whether or not the spring member has been disposed at a proper position with respect to the terminal body can be easily confirmed by a simple method for confirming whether or not the other end part of the spring member is located in the region inside the hole edge part of the through hole.

(2) Preferably, the spring member is crimped to the terminal body by a crimping portion formed on the terminal body.

Whether or not the spring member is inclined can be confirmed when the spring member is fixed to the terminal body by the crimping portion by confirming the other end part of the spring member through the through hole.

(3) Preferably, the terminal body includes a wire crimping portion to be crimped to a wire and a coupling portion provided between the connecting tube portion and the wire crimping portion to couple the connecting tube portion and the wire crimping portion, and the through hole is provided in the bottom wall of the coupling portion.

In crimping the wire crimping portion to the wire, a large force is applied to the wire crimping portion. Further, in electrically connecting the tab of the male terminal and the connecting tube portion, a large force is applied to the connecting tube portion from the resilient contact piece. On the other hand, a large force is not applied to the coupling portion unlike the wire crimping portion and the connecting tube portion. Thus, the through hole can be formed while a reduction in the strength of the terminal body is suppressed.

(4) Preferably, a shear surface is formed on the other end part of the spring member.

According to the above configuration, a die for cutting the spring member can be inserted into the through hole at the time of press working with the spring member placed on the bottom wall. In this way, press working can be performed with the spring member placed on the bottom wall.

(5) Preferably, the bottom wall is provided with an excessive deflection suppressing piece projecting toward the resilient contact piece, the excessive deflection suppressing piece suppressing excessive deflection of the resilient contact piece by coming into contact with the resilient contact piece when an excessive force is applied to the resilient contact piece, and the excessive deflection suppressing piece is separated from the one end part of the spring member.

Since the spring member has a relatively high elastic modulus, the excessive deflection suppressing piece may be deformed if the spring member contacts the excessive deflection suppressing piece. Since the excessive deflection suppressing piece is separated from the spring member according to the present disclosure, the deformation of the excessive deflection suppressing piece can be suppressed.

(6) Preferably, the connecting tube portion includes a side wall extending from a side edge of the bottom wall and the side wall includes a window portion penetrating through the side wall, and a contact part of the resilient contact piece and the one end part of the spring member is exposed through the window portion.

The contact of the resilient contact piece and the one end part of the spring member can be easily confirmed through the window portion.

(7) The present disclosure is directed to a female terminal manufacturing method for manufacturing a female terminal including a terminal body having a bottom wall and a spring member to be mounted in the terminal body, the method including forming a terminal body element piece including a through hole in the bottom wall by press-working a first metal plate material, forming a spring element piece by press-working a second metal plate material having a higher elastic modulus than the first metal plate material, placing the spring element piece on the bottom wall, and forming the spring member by press-working the spring element piece by inserting a die for press working into the through hole.

The spring member can be formed by press working with the spring element piece placed on the bottom wall.

(8) Preferably, the method further includes crimping the spring element piece or the spring member placed on the bottom wall to the bottom wall.

The spring member or the spring element piece can be firmly fixed to the bottom wall by crimping the spring member or the spring element piece to the bottom wall.

Details of Embodiment of Present Disclosure

Hereinafter, an embodiment of the present disclosure is described. The present disclosure is not limited to these illustrations and is intended to be represented by claims and include all changes in the scope of claims and in the meaning and scope of equivalents.

Embodiment

An embodiment of the present disclosure is described with reference to FIGS. 1 to 12. As shown in FIG. 1, a female terminal 1 in this embodiment is connected to a male terminal 80 (only a tab portion is shown) including a tab 81. The female terminal 1 includes a terminal body 10 and a spring member 70 formed separately from the terminal body 10 and to be mounted in the terminal body 10. In the following description, a direction indicated by an arrow Z is referred to as an upward direction, a direction indicated by an arrow Y is referred to as a forward direction, and a direction indicated by an arrow X is referred to as a leftward direction. Further, for a plurality of identical members, only some members may be denoted by a reference sign and the other members may not be denoted by the reference sign.

Figure 2:
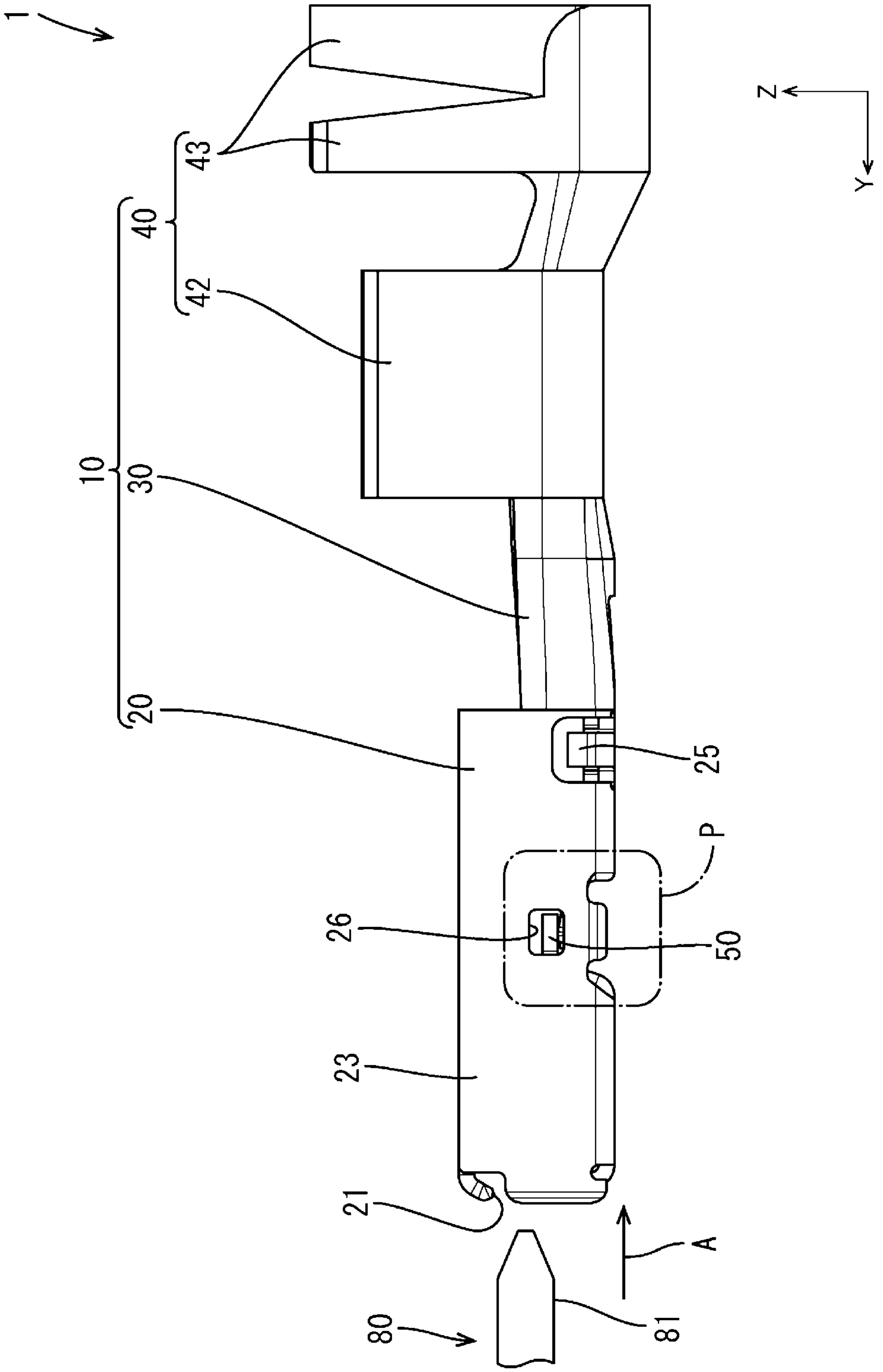
FIG. 2 is a side view showing a male terminal and the female terminal.

As shown in FIG. 1, the terminal body 10 is formed into a shape elongated in a front-rear direction by press-working a first metal plate material 90 made of copper or copper alloy such as brass. The terminal body 10 includes a bottom wall 22 extending in the front-rear direction. The bottom wall 22 is continuous from a front end part to a rear end part of the terminal body 10. As shown in FIG. 2, a connecting tube portion 20, into which the tab 81 of the male terminal 80 is inserted from a direction indicated by an arrow A, is formed in a substantially front half region of the terminal body 10, and a wire connecting portion 40 to be connected to a wire 60 is formed in a substantially rear half region.

As shown in FIG. 2, the connecting tube portion 20 is in the form of a rectangular tube elongated in the front-rear direction, and a terminal insertion opening 21, through which the male terminal 80 is inserted, is provided in the front end of the connecting tube portion 20. The connecting tube portion 20 includes a pair of side walls 23 rising upward from both left and right end edges of a front half part of the bottom wall 22 and a ceiling wall 24 facing the bottom wall 22 between the upper ends of the pair of side walls 23 (see FIG. 1).

As shown in FIG. 1, the wire connecting portion 40 is coupled to the connecting tube portion 20 via a coupling portion 30 extending rearward from the rear end of the bottom wall 22 in the connecting tube portion 20. This wire connecting portion 40 includes a rear half part of the bottom wall 22 extending rearward from the rear end of the coupling portion 30 and a pair of wire barrel portions 42 and a pair of insulation barrel portions 43 projecting from both left and right side edges of the rear half part of the bottom wall 22. The wire barrel portions 42 and the insulation barrel portions 43 are crimped and electrically and mechanically connected to a core 61 and an insulation coating 62 of the wire 60 placed on the rear half part of the bottom wall 22.

As shown in FIG. 1, a resilient contact piece 50 is disposed inside the connecting tube portion 20. The resilient contact piece 50 is formed by being bent rearward from the front end edge of the bottom wall 22. The resilient contact piece 50 extends up to a substantially central position of the connecting tube portion 20 in the front-rear direction. The resilient contact piece 50 is formed to be resiliently deformable in a vertical direction in the connecting tube portion 20 with a front end part of the bottom wall 22 as a fulcrum. A contact point portion 54 projecting upward is formed at a position near a rear end part of the resilient contact piece 50.

The contact point portion 54 resiliently contacts the tab 81 of the male terminal 80 from below.

The spring member 70 is formed by press-working a second metal plate material 91 having a higher elastic modulus than the first metal plate material 90. In this embodiment, the second metal plate material 91 is made of stainless steel. The spring member 70 is in the form of a plate elongated in the front-rear direction as a whole.

As shown in FIG. 1, a front end part (an example of one end part) of the spring member 70 is located substantially in a center of the connecting tube portion 20 in the front-rear direction with the spring member 70 placed on the bottom wall 22. The front end part of the spring member 70 serves as a biasing portion 71 for biasing the resilient contact piece 50 upward by coming into contact with a rear end part of the resilient contact piece 50 from below when the resilient contact piece 50 is resiliently deformed downward. In this way, the resilient contact piece 50 is biased in a direction toward the tab 81. When the resilient contact piece 50 is in a natural state, the rear end part of the resilient contact piece 50 and the biasing portion 71 of the spring member 70 may be separated or may be in contact.

As shown in FIG. 1, a rear half part of the spring member 70 serves as a placing portion 72 placed on the upper surface of the bottom wall 22 of the terminal body 10. The placing portion 72 is in contact with the upper surface of the bottom wall 22. A region between the biasing portion 71 and the placing portion 72 serves as an inclined portion 73 inclined upward toward the front with the spring member 70 placed on the upper surface of the bottom wall 22.

Figure 3:
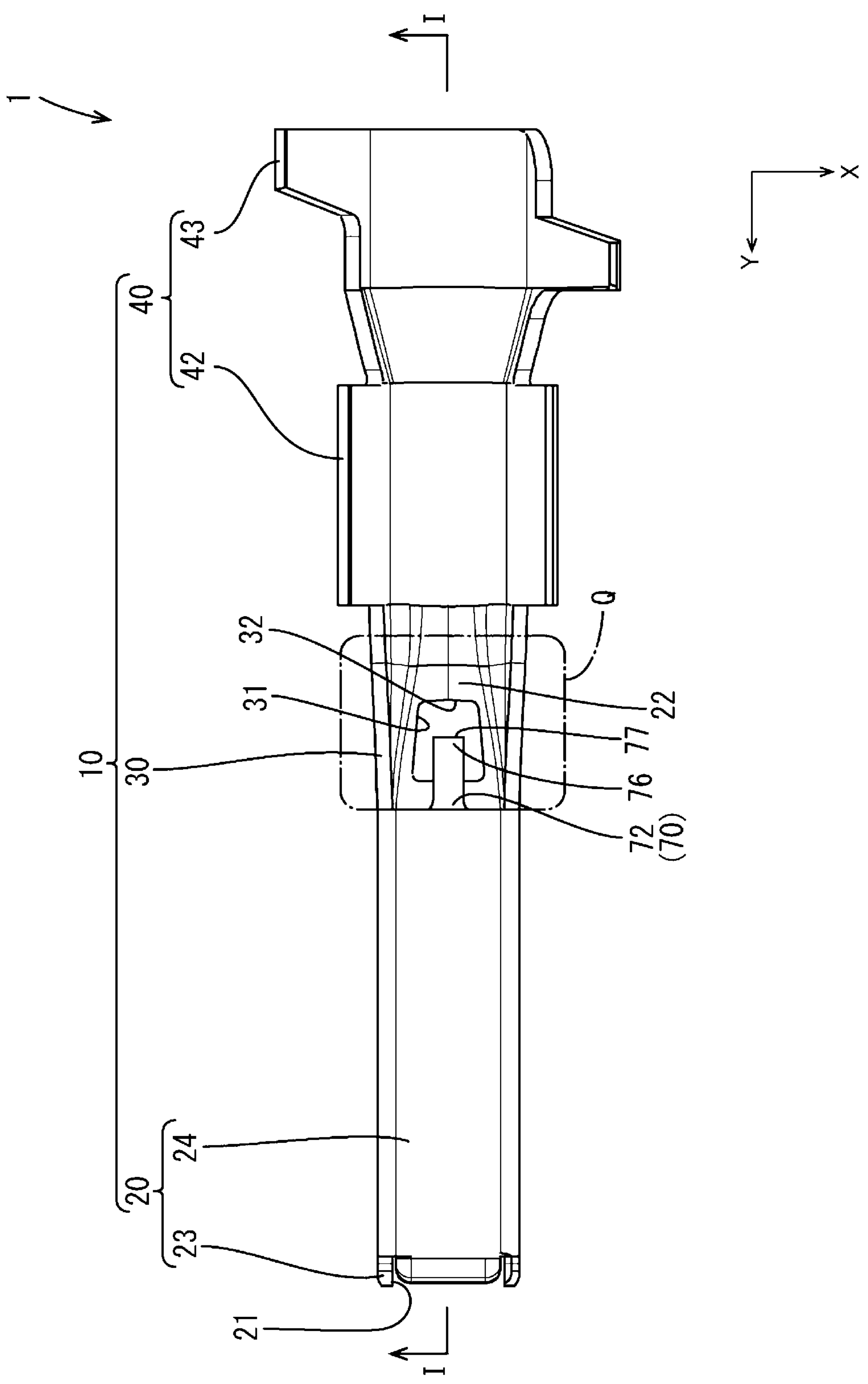
FIG. 3 is a plan view showing the female terminal.

As shown in FIG. 3, a rear end part 76 of the placing portion 72 extends further rearward than the rear end part of the connecting tube portion 20 with the spring member 70 placed on the bottom wall 22. In this way, the rear end part 76 of the placing portion 72 is located on the upper surface of the bottom wall 22 of the coupling portion 30. A later-described shear surface 77 formed by press working is formed on the rear surface of the rear end part 76 of the placing portion 72.

Figure 4:
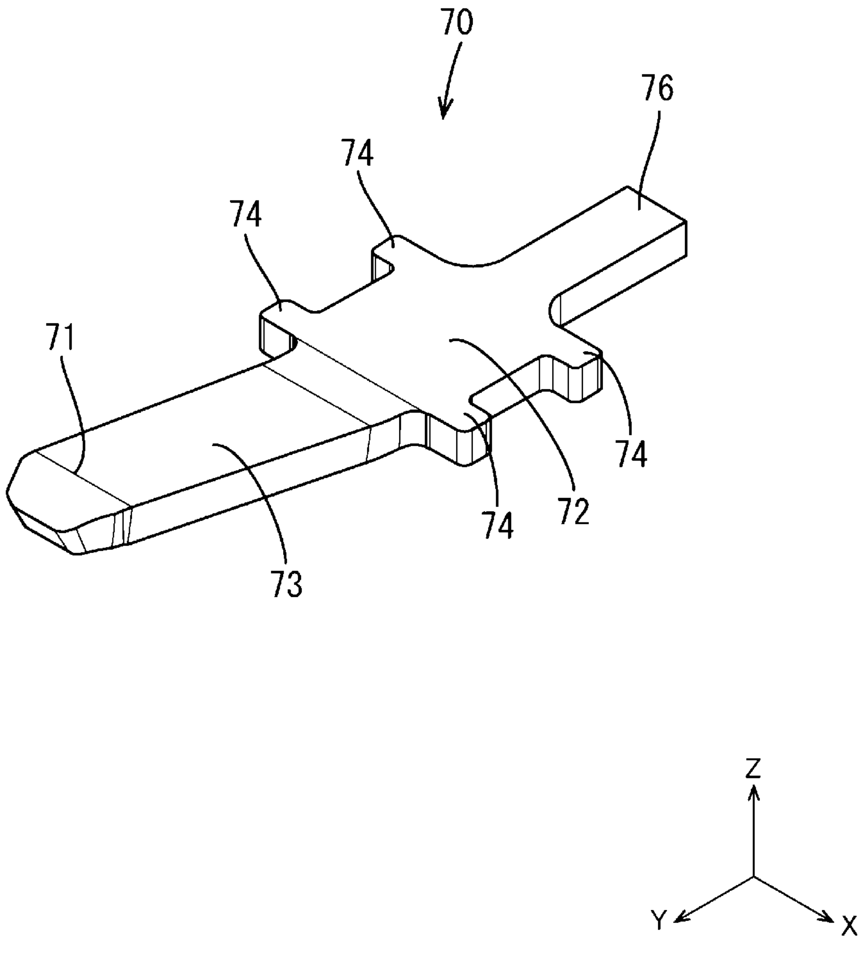
FIG. 4 is a perspective view showing a spring member.

As shown in FIG. 4, locking protrusions 74 are formed to project toward both left and right sides from both left and right side edges of a front end part of the placing portion 72. Two locking protrusions 74 are formed side by side on each side edge of the placing portion 72 while being spaced apart in the front-rear direction.

Figure 5:
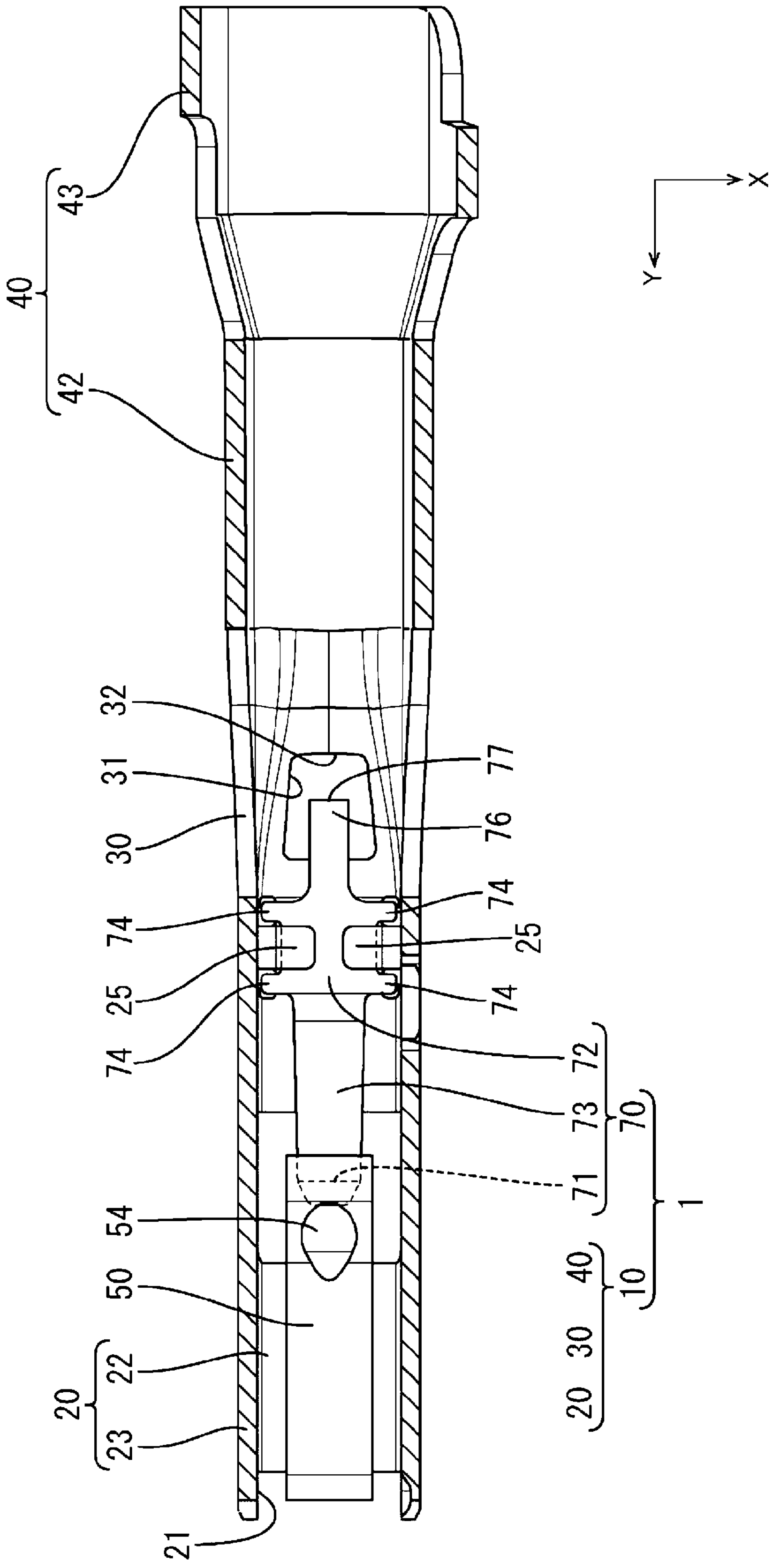
FIG. 5 is a section along V-V in FIG. 1.

As shown in FIG. 5, crimping portions 25 projecting inwardly of the connecting tube portion 20 and to be crimped to the placing portion 72 of the spring member 70 are formed on the pair of side walls 23 in the connecting tube portion 20. The crimping portions 25 are formed by cutting and raising the side walls 23 of the connecting tube portions 20. The crimping portions 25 are crimped between the two locking protrusions 74 arranged one behind the other on both side edges of the placing portion 72. In this way, the spring member 70 is mounted in the terminal body 10 with forward and rearward movements restricted. The two crimping portions 25 do not overlap each other and are disposed with a tiny gap formed between the tips thereof.

Figure 6:
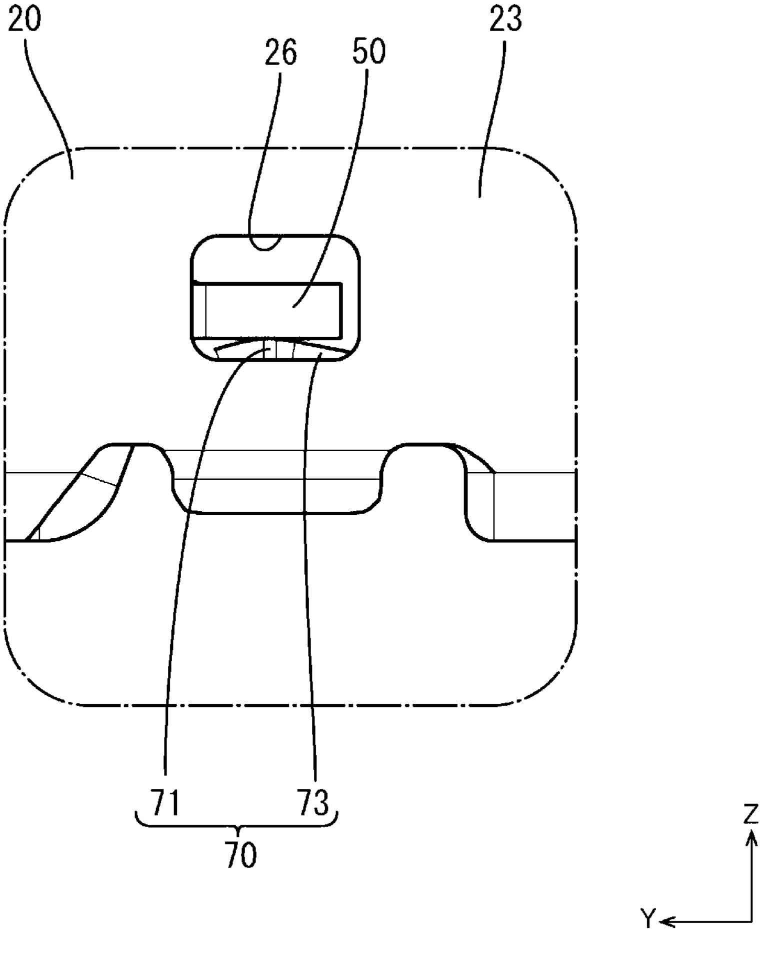
FIG. 6 is a partial enlarged side view showing a region P in FIG. 2.

As shown in FIG. 2, the side walls 23 of the connecting tube portion 20 are respectively provided with window portions 26 penetrating through the side walls 23 in a lateral direction at positions corresponding to the rear end part of the resilient contact piece 50 and left and right parts of the biasing portion 71 of the spring member 70. As shown in FIG. 6, the window portion 26 has a substantially rectangular shape when viewed from the lateral direction. The rear end part of the resilient contact piece 50 and the biasing portion 71 of the spring member 70 are arranged in a region inside a hole edge part of the window portion 26 when viewed from the lateral direction. In this way, the rear end part of the resilient contact piece 50 and the biasing portion 71 of the spring member 70 can be visually confirmed through the window portion 26.

Figure 7:
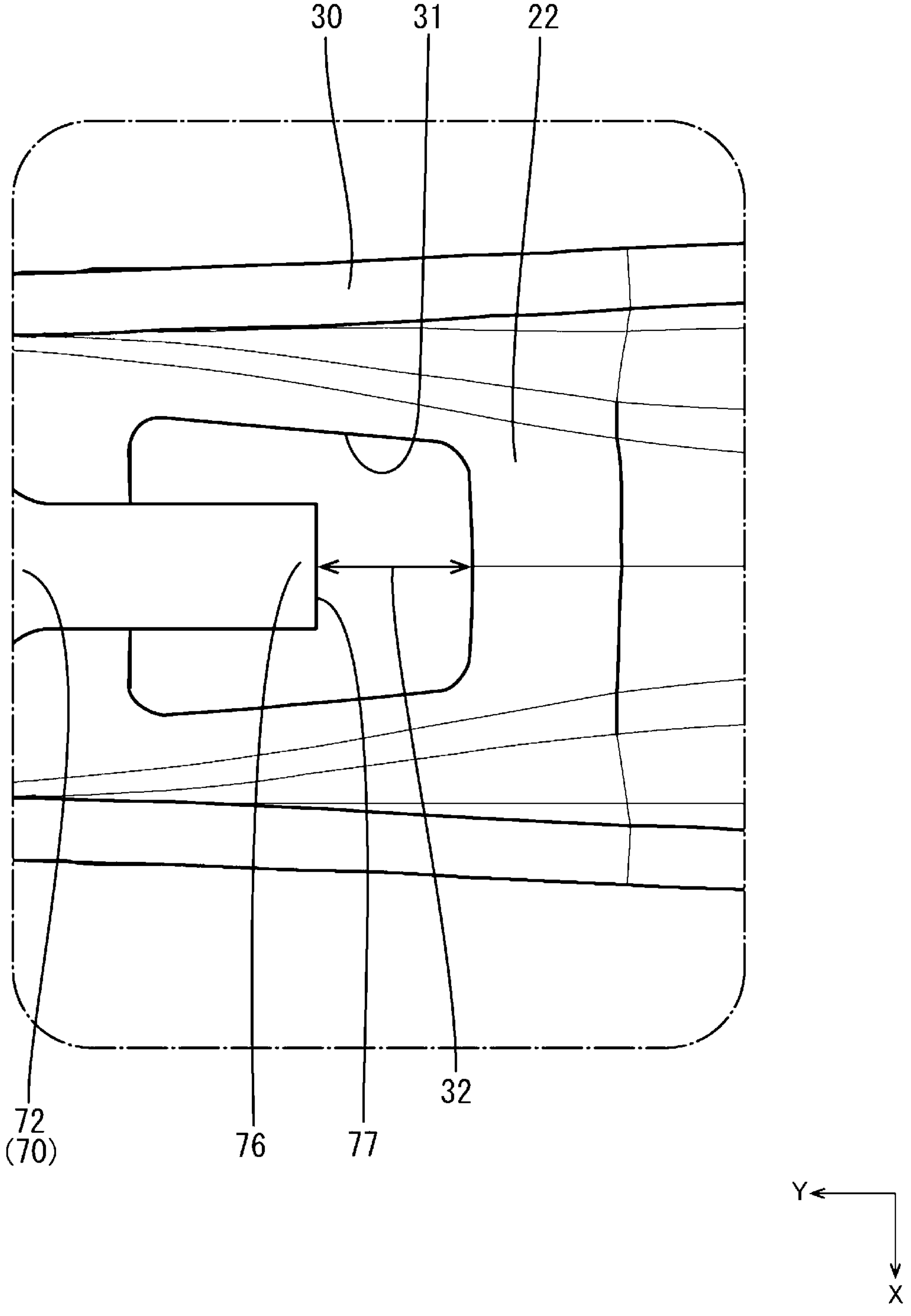
FIG. 7 is a partial enlarged plan view showing a region Q in FIG. 3.

As shown in FIG. 7, the bottom wall 22 of the coupling portion 30 is formed with a through hole 31 penetrating through the bottom wall 22 in the vertical direction. The through hole 31 has a rectangular shape when viewed from above. In particular, the through hole 31 has a substantially trapezoidal shape in which a length of a front hole edge part is longer than that of a rear hole edge part. With the spring member 70 mounted in the terminal body 10, the rear end part 76 of the spring member 70 is located in the region inside the hole edge part of the through hole 31. The lower surface of the rear end part 76 of the spring member 70 is exposed downward through the through hole 31. A gap 32 is formed between the rear end part 76 of the spring member 70 and the hole edge part of the through hole 31.

Figure 8:
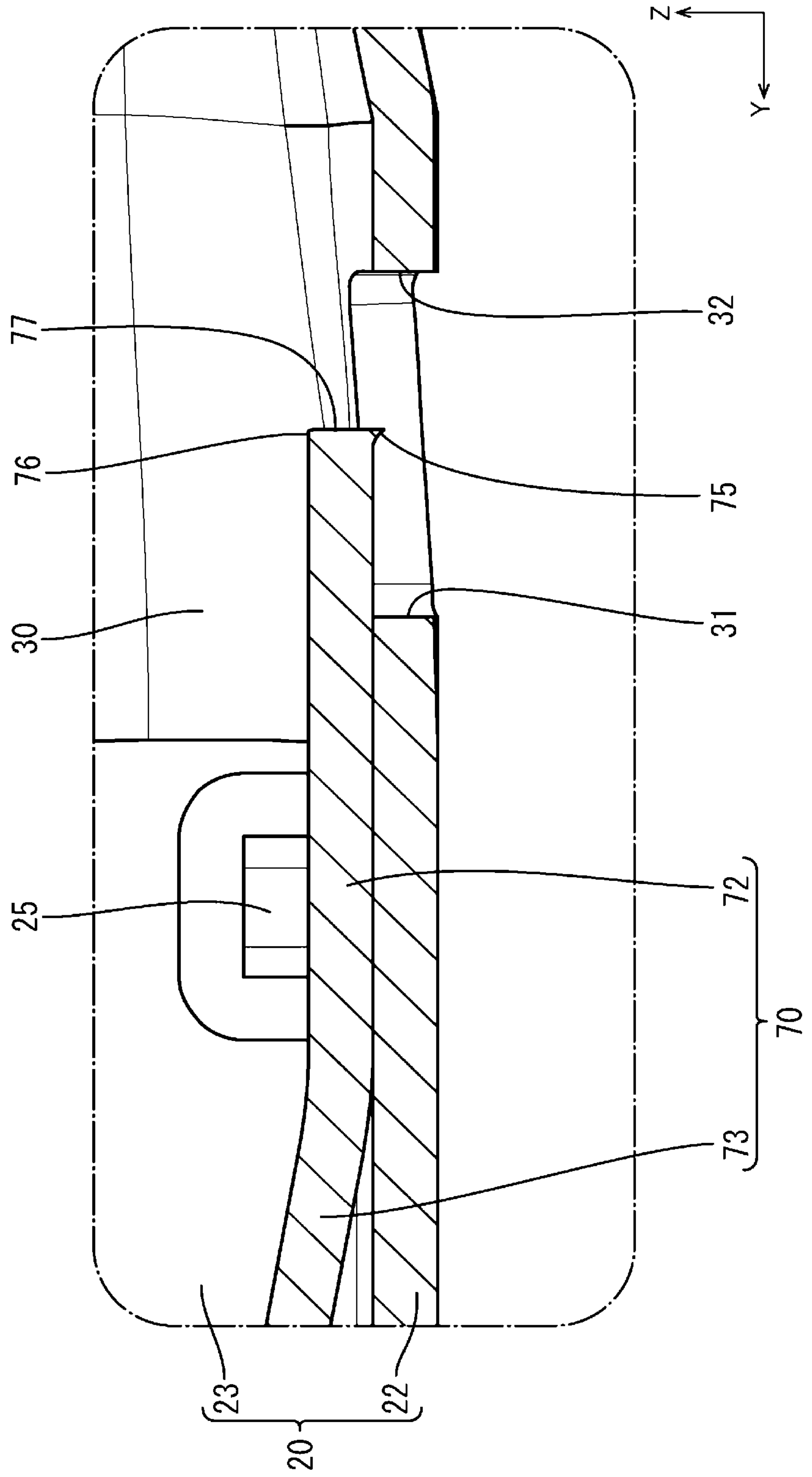
FIG. 8 is a partial enlarged plan view showing a region R in FIG. 1.

As shown in FIG. 8, the rear end part 76 of the spring member 70 may be formed with a burr 75 projecting downward or a downwardly deformed part. The burr 75 is formed when the spring member 70 is press-worked. The burr 75 is located in the region inside the hole edge part of the through hole 31. In this way, the burr 75 is disposed within the plate thickness of the bottom wall 22 and does not project outwardly of the bottom wall 22.

As shown in FIG. 1, the bottom wall 22 of the connecting tube portion 20 is provided with an excessive deflection suppressing piece 27 projecting upward at a position below the resilient contact piece 50 and forward of the biasing portion 71 of the spring member 70. The excessive deflection suppressing piece 27 is formed by cutting and raising the bottom wall 22. A gap is formed between an upper end part of the excessive deflection suppressing piece 27 and a lower edge part of the resilient contact piece 50 in the natural state. Also with the tab 81 of the male terminal 80 inserted in the connecting tube portion 20, the gap is formed between the upper end part of the excessive deflection suppressing piece 27 and the lower edge part of the resilient contact piece 50. When the resilient contact piece 50 is pressed excessively downward by the tab 81 of the male terminal 80, the upper end part of the excessive deflection suppressing piece 27 comes into contact with the lower edge part of the resilient contact piece 50 from below, thereby suppressing excessive downward deflection of the resilient contact piece 50. Note that the natural state of the resilient contact piece 50 means a state where no force is applied to the resilient contact piece 50 from outside.

Since being provided forward of the biasing portion 71 of the spring member 70, the excessive deflection suppressing piece 27 does not contact the spring member 70.

[Manufacturing Process of Female Terminal]

The female terminal 1 is, for example, manufactured as follows. Note that a manufacturing process of the female terminal 1 is not limited to the one described below.

Figure 9:
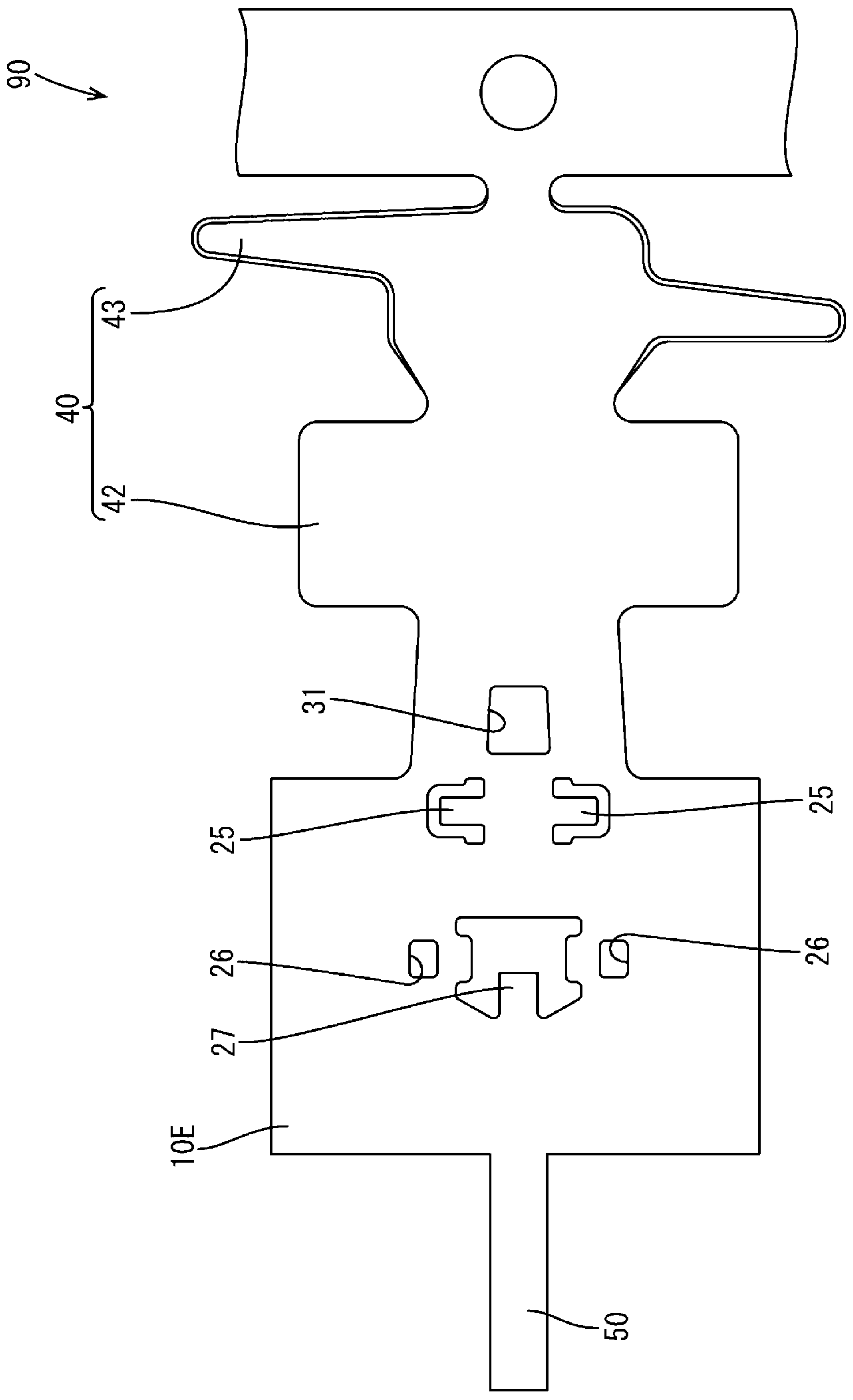
FIG. 9 is a plan view showing a terminal body element piece formed by press-working a first metal plate material.

First, as shown in FIG. 9, a terminal body element piece 10E is formed by press-working the first metal plate material 90 made of copper or copper alloy. At this time, the through hole 31 is formed in the bottom wall 22 of the terminal body element piece 10E.

Figure 10:
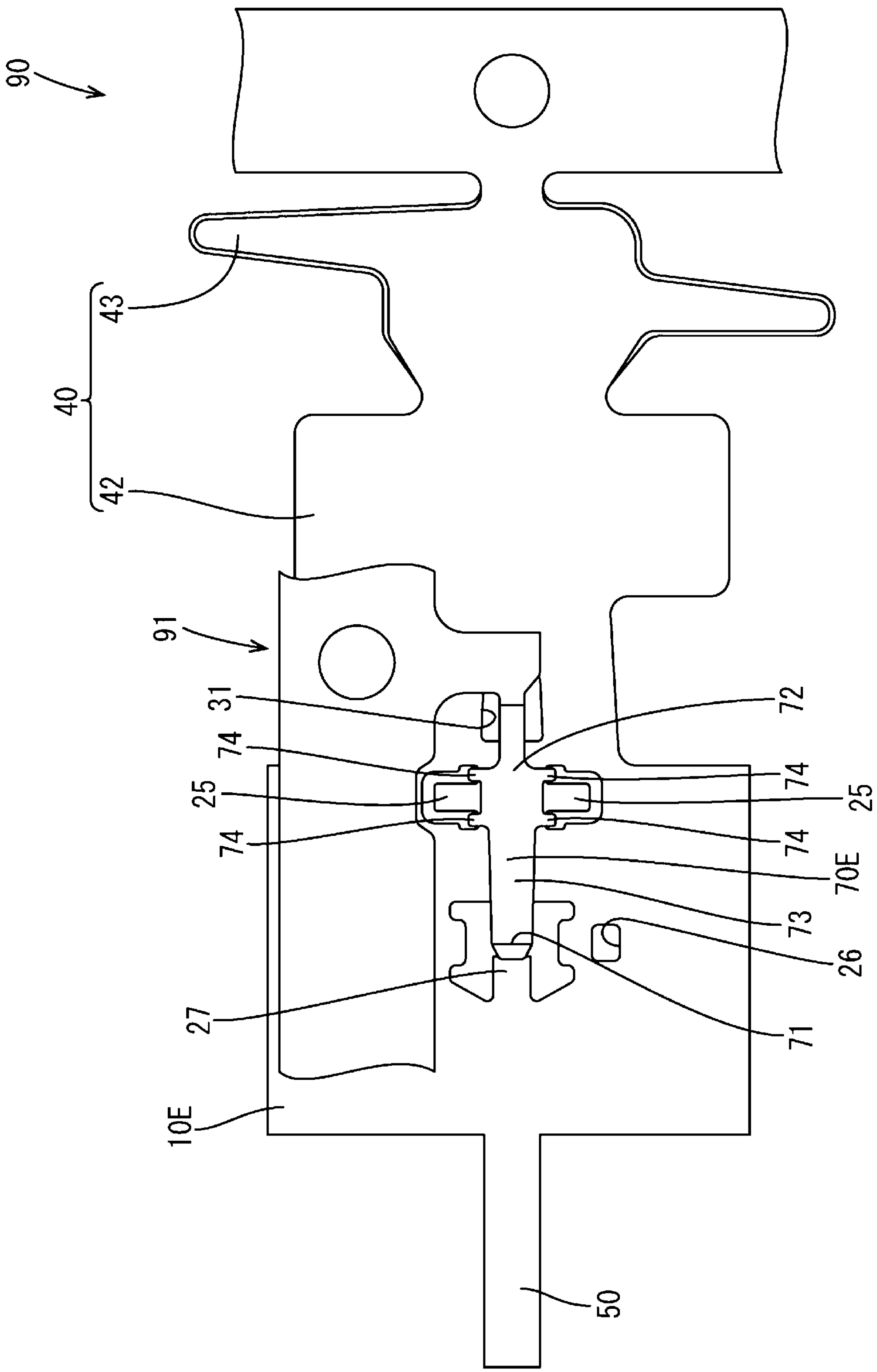
FIG. 10 is a plan view showing a state where a spring element piece formed by press-working a second metal plate material is placed on the terminal body element piece.

Subsequently, the spring element piece 70E is formed by press-working the second metal plate material 91 made of stainless steel. Subsequently, the spring element piece 70E is placed on the bottom wall 22 as shown in FIG. 10.

Figure 11:
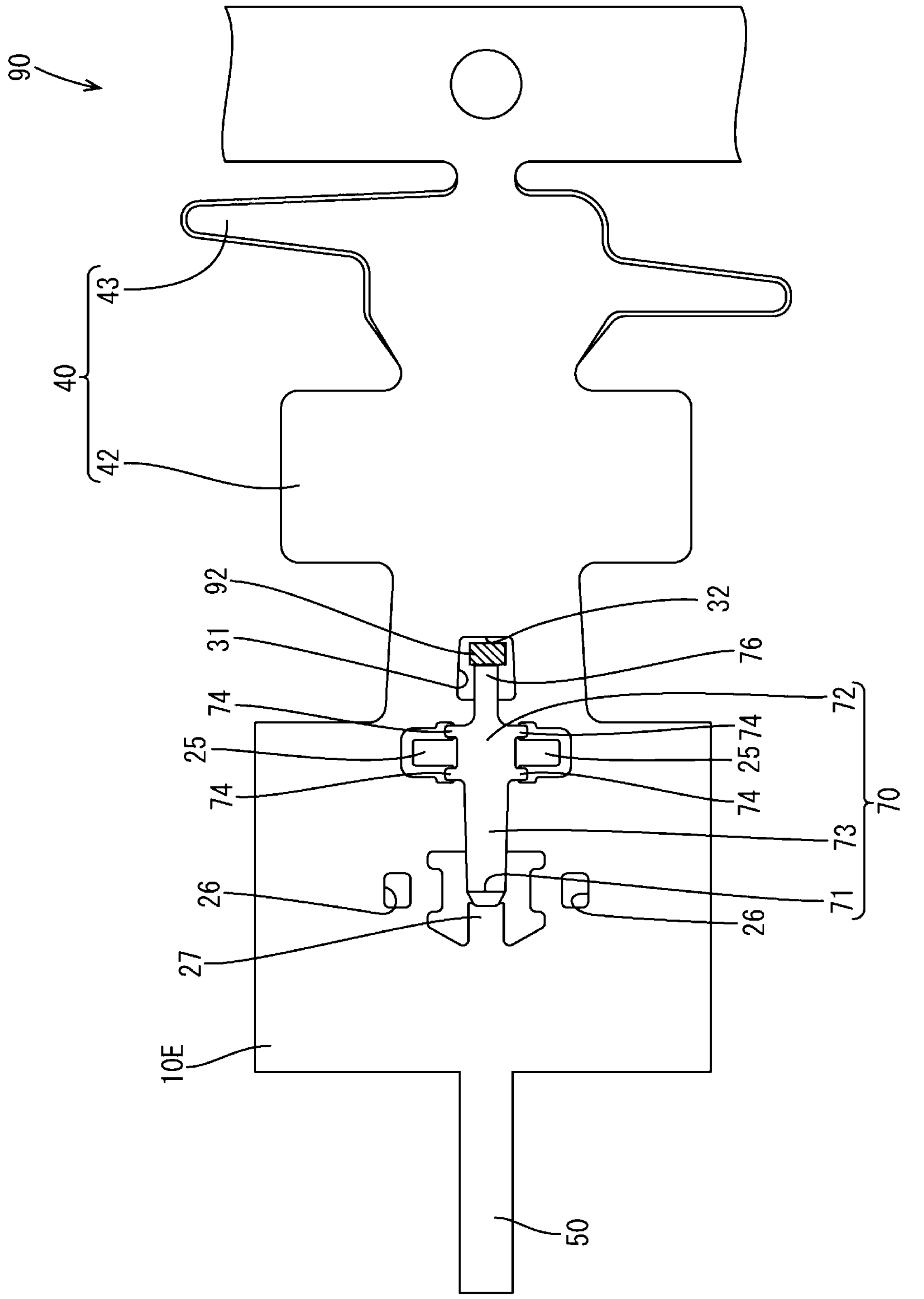
FIG. 11 is a plan view showing a state where the spring member is formed by press-working the second metal plate material.

Subsequently, as shown in FIG. 11, the spring element piece 70E is sheared to form the spring member 70 by inserting a cutting die 92 into the through hole 31 from above. At this time, the shear surface 77 is formed on the rear surface of the rear end part 76 of the spring member 70. Further, the burr 75 may be formed on the rear end part 76 of the spring member 70. The die 92 is set to have such a size as to be insertable between the hole edge part of the through hole 31 and the rear end part 76 of the spring member 70 in the vertical direction.

Figure 12:
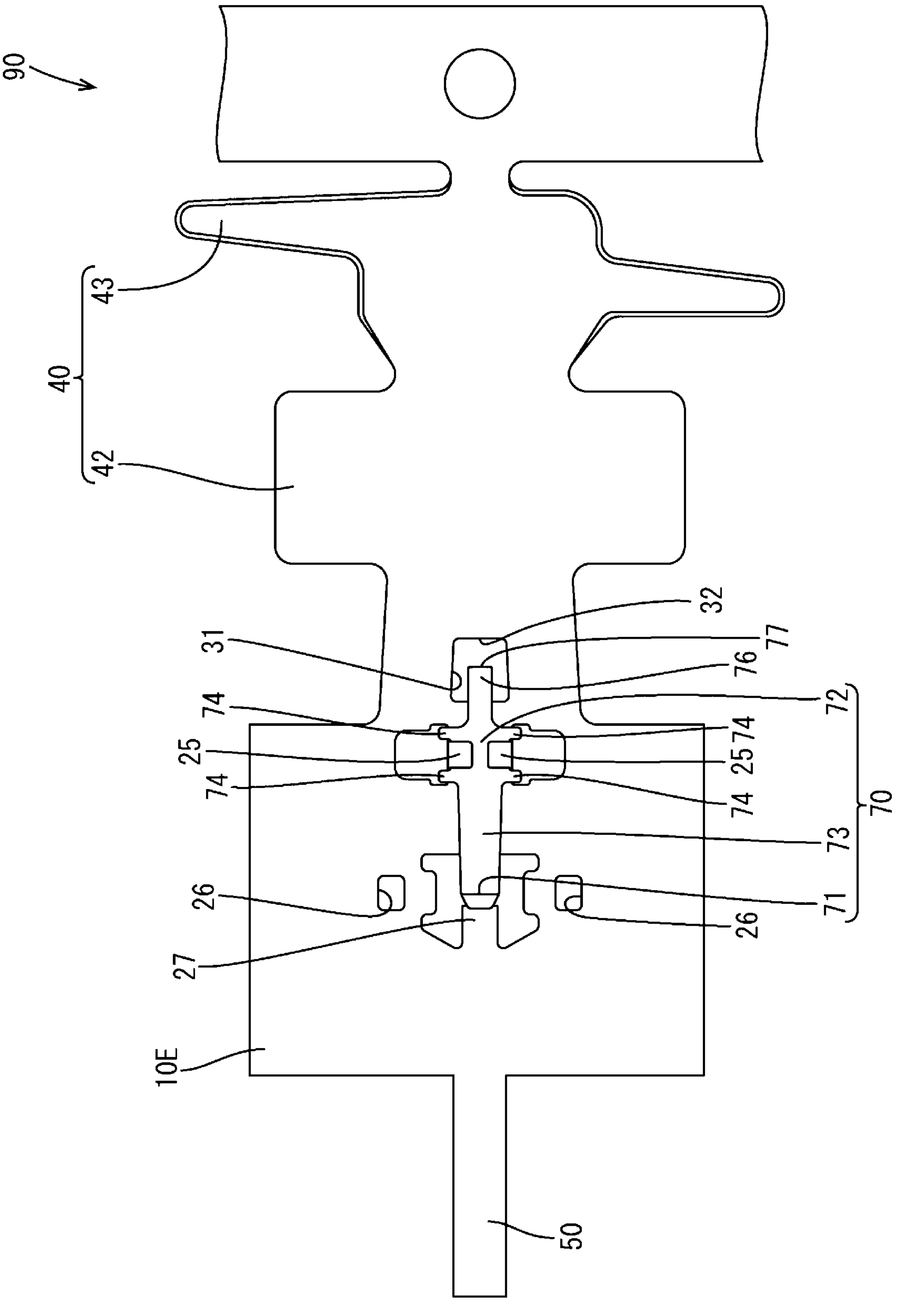
FIG. 12 is a plan view showing a state where crimping portions are crimped to the spring member.

Subsequently, as shown in FIG. 12, the crimping portions 25 are bent to tilt inwardly with the spring member 70 placed on the bottom wall 22, whereby the spring member 70 is crimped to the terminal body element piece 10E.

Note that the crimping portions 25 may be bent before the spring member 70 is sheared (shear surface 77 is formed) with the spring element piece 70E placed on the bottom wall 22. In this case, a positional deviation can be suppressed before the spring element piece 70E is press-worked.

By bending the terminal body element piece 10E, the resilient contact piece 50 and the connecting tube portion 20 are formed. In this way, the female terminal 1 is completed (see FIG. 1).

Functions and Effects of Embodiment

Next, functions and effects of this embodiment are described. The female terminal 1 according to this embodiment includes the terminal body 10 having the bottom wall 22 and the spring member 70 mounted in the terminal body 10. The terminal body 10 includes the connecting tube portion 20 continuous with the bottom wall 22, the tab 81 of the male terminal 80 being inserted into the connecting tube portion 20, the resilient contact piece 50 configured to resiliently contact the tab 81 inserted into the connecting tube portion 20 and the through hole 31 penetrating through the bottom wall 22. The spring member 70 is made of metal having a higher elastic modulus than the resilient contact piece 50. The biasing portion 71 of the spring member 70 biases the resilient contact piece 50 in the direction toward the tab 81 by coming into contact with the resilient contact piece 50. The rear end part 76 of the spring member 70 is located in the region inside the hole edge part of the through hole 31 with the spring member 70 mounted in the terminal body 10.

Whether or not the spring member 70 has been disposed at a proper position with respect to the terminal body 10 can be easily confirmed by a simple method for confirming whether or not the rear end part 76 of the spring member 70 is located in the region inside the hole edge part of the through hole 31.

Further, according to this embodiment, the spring member 70 is crimped to the terminal body 10 by the crimping portions 25 formed on the terminal body 10.

By confirming the rear end part 76 of the spring member 70 through the through hole 31, whether or not the spring member 70 is inclined can be confirmed when the spring member 70 is fixed to the terminal body 10 by the crimping portions 25.

Further, according to this embodiment, the terminal body 10 includes the wire connecting portion 40 to be crimped to the wire 60 and the coupling portion 30 provided between the connecting tube portion 20 and the wire connecting portion 40 to couple the connecting tube portion 20 and the wire connecting portion 40, and the through hole 31 is provided in the bottom wall 22 of the coupling portion 30.

A larger force is applied to the wire connecting portion 40 when the wire connecting portion 40 is crimped to the wire 60. Further, when the tab 81 of the male terminal 80 and the connecting tube portion 20 are electrically connected, a large force is applied to the connecting tube portion 20 from the resilient contact piece 50. On the other hand, a large force is not applied to the coupling portion 30 unlike the wire connecting portion 40 and the connecting tube portion 20. Thus, the through hole 31 can be formed while a reduction in the strength of the terminal body 10 is suppressed.

Further, according to this embodiment, the shear surface 77 is formed on the rear end part 76 of the spring member 70.

According to the above configuration, the die for cutting the spring member 70 can be inserted into the through hole 31 at the time of press working with the spring member 70 placed on the bottom wall 22. In this way, press working can be performed with the spring member 70 placed on the bottom wall 22.

Further, according to this embodiment, the bottom wall 22 is provided with the excessive deflection suppressing piece 27 projecting toward the resilient contact piece 50 and configured to suppress excessive deflection of the resilient contact piece 50 by coming into contact with the resilient contact piece 50 when an excessive force is applied to the resilient contact piece 50, and the excessive deflection suppressing piece 27 is separated from the front end part of the spring member 70.

Since the spring member 70 has a relatively high elastic modulus, the excessive deflection suppressing piece 27 may be deformed if the spring member 70 contacts the excessive deflection suppressing piece 27. However, since the excessive deflection suppressing piece 27 is separated from the spring member 70 according to the present disclosure, the deformation of the excessive deflection suppressing piece 27 can be suppressed.

Further, according to this embodiment, the connecting tube portion 20 includes the side walls 23 extending from the side edges of the bottom wall 22, the side walls 23 includes the window portions 26 penetrating through the side walls 23, and a contact part of the resilient contact piece 50 and the biasing portion 71 of the spring member 70 is exposed through the window portions 26.

Thus, the contact of the resilient contact piece 50 and the biasing portion 71 of the spring member 70 can be easily confirmed through the window portions 26.

The manufacturing method for the female terminal 1 according to the present disclosure is a manufacturing method for the female terminal 1 including the terminal body 10 having the bottom wall 22 and the spring member 70 to be mounted in the terminal body 10 and includes forming the terminal body element piece 10E including the through hole 31 in the bottom wall 22, forming the spring element piece 70E by press-working the second metal plate material 91 having a higher elastic modulus than the first metal plate material 90, placing the spring element piece 70E on the bottom wall 22 and forming the spring member 70 by press-working the spring element piece 70E by inserting the die 92 for press working into the through hole 31.

By performing press working with the spring element piece 70E placed on the bottom wall 22, the spring member 70 can be formed.

Further, the manufacturing method for the female terminal 1 according to this embodiment includes crimping the spring member 70 placed on the bottom wall 22 to the bottom wall 22.

By crimping the spring member 70 to the bottom wall 22, the spring member 70 can be firmly fixed to the bottom wall 22.

Other Embodiments (1) A method for fixing the spring member 70 and the terminal body 10 is not limited to crimping, and the spring member 70 and the terminal body 10 may be welded or riveted.

(2) The through hole 31 may be provided at a position different from the coupling portion 30 and, for example, may be provided in the bottom wall 22 of the connecting tube portion 20 or in the bottom wall 22 of the wire barrel portions 42.

(3) The excessive deflection suppressing piece 27 may be omitted. Further, the excessive deflection suppressing piece 27 may suppress excessive deflection of the spring member 70 by coming into contact with the spring member 70.

(4) The window portions 26 may be omitted.

(5) The burr 75 of the spring member 70 may project upward.

(6) Although the spring member 70 is crimped to the bottom wall 22 by the two crimping portions 25 in the above embodiment, there is no limitation to this and the spring member 70 may be crimped to the bottom wall 22 by three or more crimping portions 25.

From the foregoing, it will be appreciated that various exemplary embodiments of the present disclosure have been described herein for purposes of illustration, and that various modifications may be made without departing from the scope and spirit of the present disclosure. Accordingly, the various exemplary embodiments disclosed herein are not intended to be limiting, with the true scope and spirit being indicated by the following claims.

What is claimed is:

1. A female terminal, comprising:
a terminal body including a bottom wall; and
a spring member mounted in the terminal body,
wherein:
the terminal body includes
a connecting tube portion continuous with the bottom wall,
a resilient contact piece configured to resiliently contact a tab of a male terminal inserted into the connecting tube portion, and
a through hole penetrating through the bottom wall, and
the spring member is made of metal having a higher elastic modulus than the resilient contact piece,
one end part of the spring member biases the resilient contact piece in a direction toward the tab by coming into contact with the resilient contact piece, and
another end part of the spring member includes a shear surface and is located in a region inside a hole edge part of the through hole with the spring member mounted in the terminal body, the shear surface and a lower surface of the other end part of the spring member being exposed downward through the through hole.

2. The female terminal of claim 1, wherein the spring member is crimped to the terminal body by a crimping portion formed on the terminal body.

3. The female terminal of claim 1, wherein:
the terminal body includes
a wire crimping portion to be crimped to a wire and
a coupling portion provided between the connecting tube portion and the wire crimping portion to couple the connecting tube portion and the wire crimping portion, and
the through hole is provided in the bottom wall of the coupling portion.

4. The female terminal of claim 1,
wherein the shear surface is formed on the other end part of the spring member, and
wherein the other end part of the spring member includes a burr formed by press working the metal, the burr projecting upward or downward from the spring member.

5. The female terminal of claim 1, wherein:
the bottom wall is provided with an excessive deflection suppressing piece projecting toward the resilient contact piece, the excessive deflection suppressing piece suppressing excessive deflection of the resilient contact piece by coming into contact with the resilient contact piece when an excessive force is applied to the resilient contact piece, and
the excessive deflection suppressing piece is separated from the one end part of the spring member.

6. The female terminal of claim 1, wherein:
the connecting tube portion includes a side wall extending from a side edge of the bottom wall and the side wall includes a window portion penetrating through the side wall, and
a contact part of the resilient contact piece and the one end part of the spring member is exposed through the window portion.

* * * * *